H. COOK.
Stove Pipe.
No. 232,005.                    Patented Sept. 7, 1880.
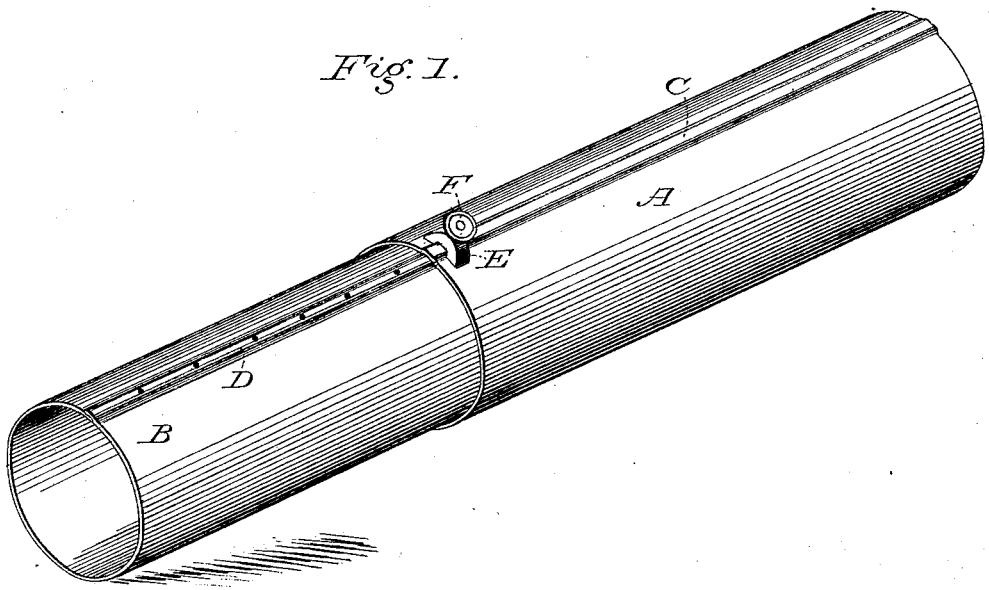
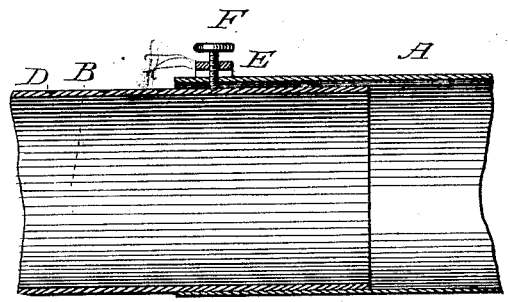
Witnesses:                                   Inventor:

UNITED STATES PATENT OFFICE.

HENRY COOK, OF MONUMENT, COLORADO.

STOVE-PIPE.

SPECIFICATION forming part of Letters Patent No. 232,005, dated September 7, 1880.

Application filed April 22, 1879.

*To all whom it may concern:*

Be it known that I, HENRY COOK, of Monument, in the county of El Paso and State of Colorado, have invented a new and useful Improvement in Stove-Pipes, which improvement is fully set forth in the following specification, reference being had to the accompanying drawings, in which—

Figure 1 is a perspective view of a stove-pipe whose joints are connected according to my invention, and Fig. 2 is a longitudinal section of the same.

My invention is an improvement in stove-pipe joints and means for connecting them, whereby the joints are adapted to slide telescopically one into another, and may be secured in any lengthwise adjustment, so that the pipe may be used in situations where joints of the regular or usual length would not be available.

My invention consists in the specific construction and combination of parts hereinafter described.

In the drawings, A and B indicate two joints or lengths of stove-pipe. One end of each joint is tapered or made smaller than the other end, so that it will enter the larger end of another joint. In this instance the joint B enters the joint A, and is secured thereto by means of a screw-clamp.

The joint A has a lengthwise exterior rib, C, and corresponding interior groove. The joint B has a similar exterior rib, D, and inner groove. A series of indentations is formed in said rib D to receive the point of a thumb-screw, F, which passes through the rib C of joint A, and through a chair, E, attached to said rib. The chair and screw are located at the larger end of the joint A, and it is apparent that by turning the screw in one direction it will hold the joints immovably connected, and by reversing the screw the joint B will be released, and may be slid farther into or drawn out of the joint A. In this manner the aggregate length of a stove-pipe formed by two or more joints thus connected may be adjusted according to requirements.

The coupling or clamp is simple and cheap, and is in these as well as other particulars distinguished from others of its class.

What I claim is—

The combination, with a tapered stove-pipe joint or section, B, having a series of indentations in its rib D, of the joint A, having an interior lengthwise groove, and the thumb-screw F and chair E, said screw passing through the latter and entering an indentation in joint B, all as shown and described, for the purpose specified.

HENRY COOK.

Witnesses:
CHAS. S. TINER,
MINA COOK.